United States Patent [19]

Keller et al.

[11] Patent Number: 4,943,405
[45] Date of Patent: Jul. 24, 1990

[54] METHOD AND APPARATUS FOR MANUFACTURING COMPRESSION MOLDED ARTICLES FROM THERMOPLASTIC MATERIAL

[75] Inventors: Gerhard Keller, Jongny; Andreas Iseli, Ollon, both of Switzerland

[73] Assignee: AISA Automation Industrielle S.A., Vouvry, Switzerland

[21] Appl. No.: 310,354

[22] Filed: Feb. 13, 1989

[30] Foreign Application Priority Data

Feb. 12, 1988 [DE] Fed. Rep. of Germany ....... 3804464

[51] Int. Cl.⁵ .............................................. B29C 43/02
[52] U.S. Cl. .................................... 264/322; 264/325; 264/335; 425/125; 425/387.1; 425/393; 425/398; 425/414; 425/437
[58] Field of Search ...................... 425/126.1, 125, 327, 425/414, 387.1, 393, 398, 437; 264/322, 325, 335

[56] References Cited

U.S. PATENT DOCUMENTS

| 3,313,875 | 4/1967 | Magerle | 425/327 |
|---|---|---|---|
| 3,861,846 | 1/1975 | Berry | 425/531 |
| 3,930,770 | 1/1976 | Gaudet | 425/107 |
| 4,351,629 | 9/1982 | Farrell | 425/125 |
| 4,492,548 | 1/1985 | Hubert | 425/125 |
| 4,834,641 | 5/1989 | Keyser | 425/126.1 |

FOREIGN PATENT DOCUMENTS

| 2842515 | 9/1980 | Fed. Rep. of Germany . |
| 3023415 | 1/1981 | Fed. Rep. of Germany . |
| 3804464 | 6/1989 | Fed. Rep. of Germany . |

Primary Examiner—Jay H. Woo
Assistant Examiner—Jeremiah F. Durkin, II
Attorney, Agent, or Firm—Collard, Roe & Galgano

[57] ABSTRACT

A method and apparatus for manufacturing compression molded articles from a thermoplastic material blank comprising heating the material, and compression molding the blank by means of a die. The material forming the blank is deposited on the surface of an intermediate support which forms a part of the compression molding mold and extends under and is separated from the die. The blank is separated from the die, which may be accomplished using a heated stream of gas surrounding the die and directed at the point of separation. The blank is introduced into the mold which is closed as the intermediate support is lowered, followed by compression molding the blank by the application of compression molding pressure, and cooling the molded article at least partly under pressure.

7 Claims, 2 Drawing Sheets

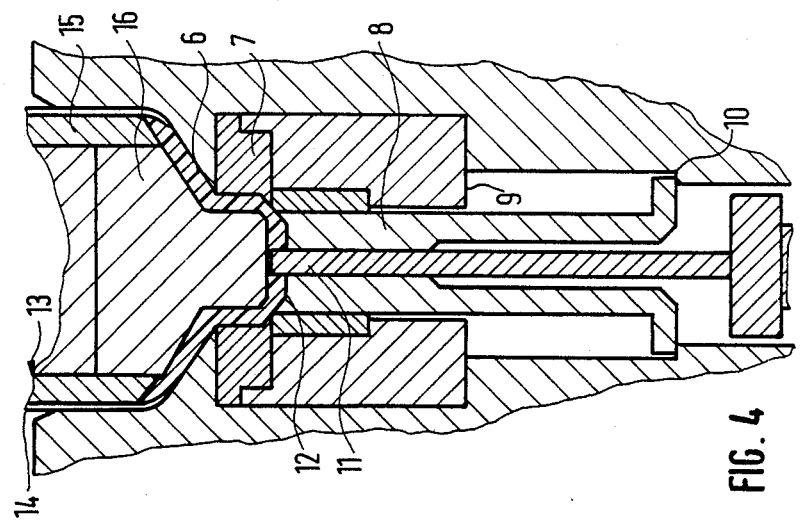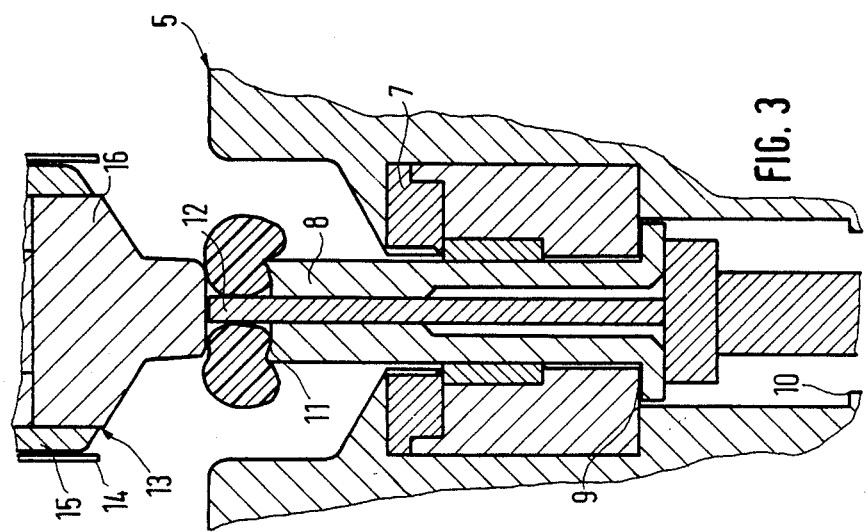

METHOD AND APPARATUS FOR MANUFACTURING COMPRESSION MOLDED ARTICLES FROM THERMOPLASTIC MATERIAL

BACKGROUND OF THE INVENTION

1. Field of the Invention

The present invention :elates generally to a method and apparatus for manufacturing compression molded articles from thermoplastic material. More specifically, the present invention relates to such a method wherein the thermoplastic material is heated, a blank is molded by means of a die which may be annular, and the blank is separated from the die using a heated stream of gas which surrounds the die and is directed at the point of separation of the blank from the die. The blank is introduced in a compression molding mold which is then closed, the compressed article is molded by application of a molding pressure, and cooled at least partly under pressure. The apparatus of the present invention relates to an apparatus for carrying out the inventive method having an extruder for heating thermoplastic material with a closable die suitable for dispensing portions of the molding material which may be annular, and which may be surrounded by an annular nozzle for discharging a heated stream of gas directed at the point of separation of the material portions from the die, at least one closable compression molding mold consisting of a molding matrix and a molding mandrel, wherein the molding matrix can be arranged beneath the die in one process step and coaxially with the molding mandrel in another process step, whereby a molding pressure is applied to and maintained on the molding mandrel and/or the molding matrix.

2. The Prior Art

A method such as discribed above is disclosed in U.S. Pat. No. 3,313,875, to Magerle, granted Apr. 11, 1967. In the method according to this patent, the thermoplastic material is dispensed by an annular die and applied to a projection of the die, so that the connection with the gap of the die is maintained and the molding material adheres to the projection of the die, from where it is later stripped when the mold is closed. Thus, the blank is cooled even before it is passed into the mold, on the one hand, and problems are encountered, on the other hand, with the stripping of the molding material from the die because of the adhesion and sticking of the thermoplastic material to the projection of the die, such problems interfering with the function of the stripper.

A similar method is described in German patent No. DE 30 23 415, in which the blanks, which are separated from the die by the closing of the latter, are admitted into the hollow space of the molding press by being permitted to free fall into the space. In this way, separated blanks do not come into contact with the cooled surfaces of the mold as such portions drop down. However, the blanks do dwell in the cooled mold for a period of time amounting to several times the dropping time, i.e., until the mold is removed from the die and brought into axial position with the molding plunger. Thus, since the blanks have relatively large areas of contact with the cooled mold, the plastic material starts to cool in the areas of contact, which adversely affects the compressibility of the plastic material and the quality of the manufactured molded articles. If the die and/or its closing elements are not finished with the highest degree of precision, or if they are not clean and have foreign matter sticking to them, the blank cannot be separated simultaneously along the entire circumference thereof, so that it does not drop into the hollow space of the mold with precise alignment, which by itself or in combination with parts of the plastic compound that have prematurely cooled on the walls of the mold, results in unevenly molded articles which must be rejected. The same unacceptable result can be achieved, if the annular stream of gas, if any, directed at the point at which the blank is separated from the die, acts unevenly on the blank. The effect of this is first an uneven detachment of the blank, and, second, an acceleration of the blank in a non-axial direction, so that the blank cannot pass into the hollow space of the mold centrally aligned.

Apparatus is known from U.S. Pat. No. 3,313,875, DE 30 23 415, and also from U.S. Pat. No. DE 28 42 515, for carrying out the method which is afflicted with the above-mentioned problems.

SUMMARY OF THE INVENTION

The object of the present invention is to enhance the method and apparatus described above in such a way that contact between the blank and the cooled mold is kept to a minimum.

The above object is accomplished in accordance with the present invention by providing a method and apparatus for manufacturing compression molded articles from thermoplastic material consisting of heating the material, compression molding the blank by means of a die wherein the material forming the blank is deposited on the surface of an intermediate support which forms a part of the compression molding mold and extends under and is separated from the die, separating the blank from the die, which may be accomplished using a heated stream of gas surrounding the die and directed at the point of separation, introducing the blank into the mold and closing the same as the intermediate support is lowered, compression molding the blank by the application of compression molding pressure, and cooling the molded article at least partly under pressure.

By depositing the thermoplastic, heated molding material exiting from the molding die on the surface of an intermediate support, which is a part of the compression-molding mold and extended under the die, an aligned and thus centered dispensing is accomplished because of the short distance. This, in effect avoids uneven separation of the blank or contamination along the circumference thereof, which would influence the position of the blank. The same applies to the effect of an annular stream of gas, if used. The blank rests on only one part of the mold, so that any cooling of the blank on such part has practically no effect on the quality of the molded article. By maintaining the intermediate support in the extended position, the blank is exposed to hot ambient air on all sides except for the side on which it rests, so that the blank comes into contact with the major part of the cooled mold only when the actual compression molding starts.

Because the blank is subjected to minor cooling from the moment it is produced until it is compressed, and during that period substantially only at points which are no longer moved in the final shaping of the blank, the temperature of the heated plastic material can be lower than in prior art methods, which, on the one hand, saves melting energy, and, on the other hand, accelerates solidification of the material since it does not have to be cooled for as long a period of time. Hence the invention significantly contributes to energy savings and acceleration of the manufacturing process.

According to an advantageous feature of the method of the present invention, the blank is deposited on the surface of the intermediate support in such a way that it overlaps the support along the circumference thereof. In this way, the area of contact between the blank and the intermediate support is reduced further, so that even less cooling is required.

Since the surface of the intermediate support is part of the mold delimiting the final shape of the molded article, minor cooling of the blank that may occur at the contact zone is not disadvantageous because the plastic compound does not need to be removed from this central zone during the actual compression process.

The present invention is explained in greater detail by reference to the accompanying drawings of an apparatus for the manufacture of head pieces of tubes, wherein the body of the tube can be simultaneously joined with the manufactured head piece. It is to be understood that the drawings are designed as an illustration only and not as a definition of the limits of the invention.

BRIEF DESCRIPTION OF DRAWINGS

In the drawings wherein similar reference characters denote similar elements throughout the several views:

FIG. 3 is a schematic cross-sectional view of the molding matrix according to FIGS. 1 and 2, and a molding mandrel associated therewith; and FIG. 4 is a schematic cross-sectional view of the molding matrix and the molding mandrel in their compressing positions.

DETAILED DESCRIPTION OF PREFERRED EMBODIMENT

Figure 2:
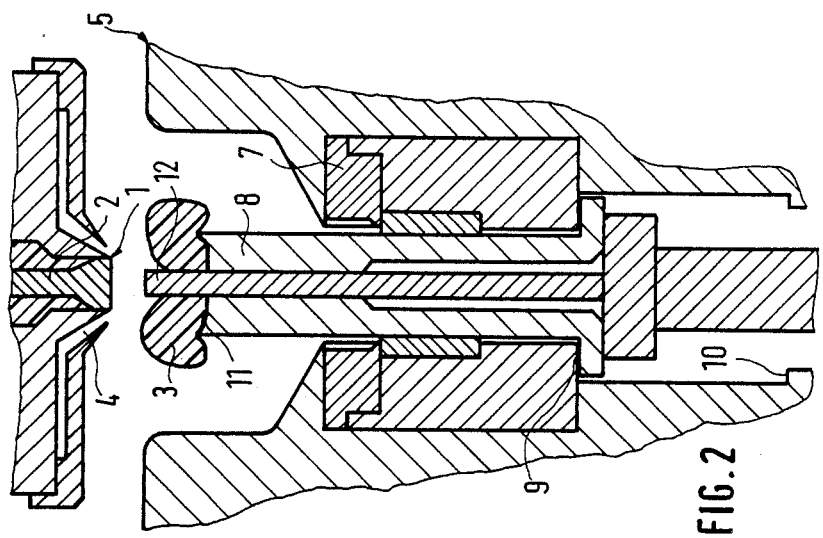
FIG. 2 is a view similar to that of FIG. 1 with the molding die in its closed position.
Figure 1:
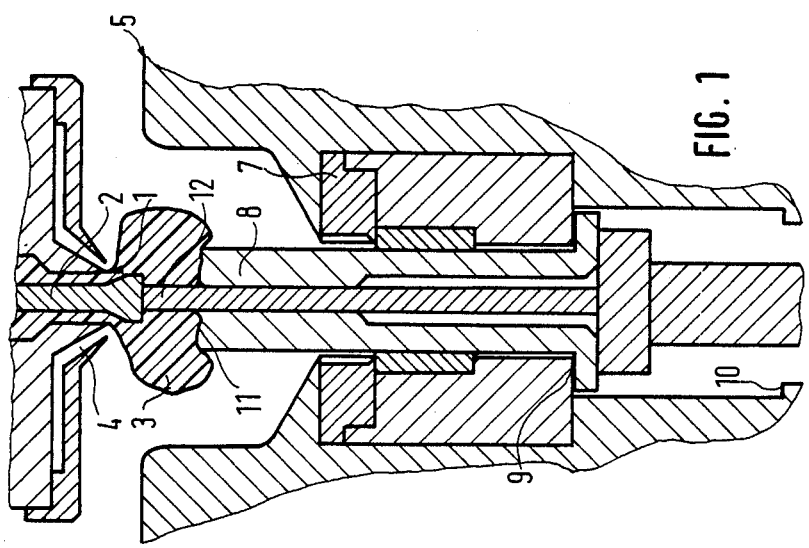
FIG. 1 is a schematic cross-sectional view of an open molding die for dispensing or metering thermoplastic molding material and an intermediate part which is a component of a molding matrix of a compression mold.

Now turning to the drawings, there is shown in FIGS. 1 and 2 a molding die 1 for metering and dispensing thermoplastic molding material from an extruder (not shown in the drawing), by which the thermoplastic material is heated. Molding die 1 has a closing element 2, by means of which a desired quantity of plastic molding material can be dispensed in the form of an annular blank 3. The outlet of die 1 is surrounded by an annular nozzle 4 from which hot air may be emitted for the purpose of facilitating the separation of blank 3 when the closing element 2 of die 1 is closed, and also for circulating hot air around blank 3 in its supported position, in order to prevent cooling of the blank.

A molding matrix 5, which is part of a mold for the manufacture of a tube head, as clearly seen in FIG. 4, is arranged axially with die 1. The interior of molding matrix 5 is designed in such a way that it reproduces the external shape of tube head 6 to be manufactured. Customarily, molding matrix 5 has a structure composed of several parts including a part 7 for the threaded neck of tube head 6. An intermediate support 8 is centrally arranged and axially displaceable between top and bottom stops 9 and 10, respectively. In the final top position, which is delimited by stop 9, intermediate support 8 is arranged with a spacing from die 1 such that the molding material exiting from die 1 is directly deposited on surface 11 of intermediate support 8. The spacing between surface 11 and die 1 can be selected in such a way that the required quantity of molding material can be precisely accommodated. However, it is possible also to arrange surface 11 of intermediate support 8 directly beneath die 1, and to continuously lower intermediate support 8 as required by the quantity being dispensed by die 1.

An extendable rod 12 is arranged centrally within and coaxially with intermediate support 8. Rod 12 protrudes beyond surface 11 of intermediate support 8 and, on the one hand, serves to center the flow of molding compound exiting from die 1 with an annular cross section, such stream of plastic forming blank 3, and, on the other hand, keeps the outlet opening of tube head 6 free as the latter is being compression molded.

Intermediate support 8 and rod 12 may be extended and retracted by any desired, known drive for example, spring force, hydraulics or pneumatics.

Surface 11 may be designed plane or it may be adapted to the requirements of the shape of the tube head. Preferably, surface 11 of intermediate support 3 is concave or dish-shaped, or it may be designed with an elevated circumferential edge as shown in the drawing. In the retracted position shown in FIG. 4, surface 11 of intermediate support 8 forms the part of molding matrix 5 shapes the external surface surrounding the opening of tube head 6.

In FIG. 3 there is shown the bottom end of a molding mandrel 13. Mandrel 13 has a sleeve 15 supporting a tube body, a molding plunger 16 reproducing the inner shape of tube head 6 is axially movable in sleeve 15 and movable therein relative to the sleeve.

The method of the present invention is carried out in the described apparatus as follows: A molding matrix 5 is arranged beneath die 1 of the extruder (not shown). On opening of closing element 2 of die 1, a stream of heated thermoplastic molding material with an annular cross section flows from the orifice of the die and supports itself on surface 11 of intermediate support 8. Die 1 remains open until the required quantity of molding material has been dispensed, so that the material prefereably freely overlaps the edges of surface 11 of intermediate support 8. When die 1 is open, rod 12 in intermediate support 8 is in contact with closing element 2 of die 1, which guides and centers the flow of plastic molding material, the latter exiting in the form of a tube, in the interior. By the closing of closing element 2, if necessary with the support of a heated stream of gas exiting from annular nozzle 4, the feed of further plastic material is cut off and a tubular blank 3 with overlapping edges is separated from die 1, as shown in FIG. 2. As clearly seen in FIG. 2, there is little contact between blank 3 and intermediate support 8 or rod 12 based on the total mass of the blank. Unlike molding matrix 5, which is cooled in order to insure faster cooling of the molded article, neither rod 12 nor intermediate support 8 is cooled directly. Thus, blank 3 remains hot prior to the compression molding of the article. Minor cooling of blank 3 is not only acceptable, but even desirable because the points of contact between blank 3 and rod 12 must not be moved or moved only slightly during the actual compressing process, so that high mobility of the plastic molding material is not needed there.

By isolating cooled molding matrix 5 with air, the latter, in effect, cannot transmit any cooling to blank 3. If heated air exits from annular nozzle 4, such air circulates around blank 3 and the latter may be kept at the desired temperature by controlling the air temperature, i.e., the blank may be heated too, if necessary. Blank 3 is kept in the support position until molding matrix 5 has been coaxially aligned with molding mandrel 13. As the molding matrices are customarily arranged in a rotary table, such alignment may be carried out in one cycle or several steps without risking significant cooling of blank 3, as would necessarily be the case if a blank were deposited from the die directly onto a cooled molding matrix. When molding mandrel 13 is driven into its working position, i.e., when plunger 16 of the mandrel comes into contact with the top end of rod 12, and molding mandrel 13 is then lowered further, intermediate support 8 with rod 12 is also lowered until it reaches bottom stop 10. Sleeve 15 with tube body 14 is also shifted into the intended position within molding matrix 5, whereupon molding plunger 16 is lowered further in molding matrix 5, applying a compressing pressure, and rod 12 is displaced relative to intermediate support 8 into the position shown in FIG. 4, whereby the tube head receives its final shape and is joined with the body of the tube. In this position, molding plunger 16 is maintained under pressure until the required cooling time has elapsed. Of course, it is also possible to move or displace only the molding matrix against a stationary molding mandrel, or vice versa. Furthermore, it is possible to displace both the mandrel and the matrix against each other.

While only a single embodiment of the present invention has been shown and described, it will be obvious that many changes and modifications may be made thereunto without departing from the spirit and scope of the invention.

What is claimed is:

1. In a method for manufacturing compression molded articles from thermoplastic material wherein the material is heated, a blank is compression molded by means of a die, the blank is separated from the die and introduced in a mold which is then closed, the blank is then compression molded by the application of a compression molding pressure, and the molded article cooled at least partly under pressure, the improvement comprising:
   depositing the heated thermoplastic material forming the blank on the surface of an intermediate support which surface being a part of the closed compression molding mold and which extends beneath the die and is separated therefrom, and lowering the intermediate support as the mold closes.

2. The method as defined in claim 1, wherein the blank is deposited on the surface of the intermediate support so that it overlaps the surface along the circumference.

3. In an apparatus for manufacturing compression molded articles from thermoplastic material heated in an extruder comprising a closable die adapted for dispensing portions of the material, and at least one closable compression molding mold consisting of a molding matrix and a molding mandrel, wherein the molding matrix is adapted to be arranged beneath the die in one process step and coaxially with the molding mandrel in another process step, whereby a compression molding pressure can be applied to and maintained on at least one of said molding matrix and said molding mandrel, the improvement comprising:
   an extendable intermediate support arranged in the molding matrix, said support having a free surface which is the retracted position of the support forms part of the closed molding surface of the molding matrix reproducing the molded article.

4. The apparatus as defined in claim 3, which further comprises a coaxially disposed, axially extendable rod arranged in said intermediate support.

5. The apparatus as defined in claim 3, wherein said free surface of said intermediate support is elevated at its outer circumference.

6. In a method for manufacturing compression molded articles from thermoplastic material wherein the material is heated, a blank is compression molded by means of a die, the blank is separated from the die using a heated stream of gas, the gas surrounding the die and being directed at the point of separation of the blank from the die, the blank then being introduced in a mold which is then closed, the blank is then compression molded by the application of a compression molding pressure, and the molded article cooled at least partly under pressure, the improvement comprising:
   depositing the heated thermoplastic material forming the blank on the surface of an intermediate support which surface being a part of the closed compression molding mold and which extends beneath the die and is separated therefrom, and lowering the intermediate support as the mold closes.

7. In an apparatus for manufacturing compression molded articles from thermoplastic material heated in an extruder comprising a closable die adapted for dispensing portions of the material, a nozzle surrounding the die for discharging a stream of heated gas directed at the point at which the portions of material are separated from the die, and at least one closable compression molding mold consisting of a molding matrix and a molding mandrel, wherein the molding matrix is adapted to be arranged beneath the die in one process step and coaxially with the molding mandrel in another process step, whereby a compression molding pressure can be applied to and maintained on at least one of said molding matrix and said molding mandrel, the improvement comprising:
   an extendable intermediate support arranged in the molding matrix, said support having a free surface which in the retracted position of the support forms part of the closed molding surface of the molding matrix reproducing the molded article.

* * * * *